(12) United States Patent
Gomez (10) Patent No.: US 10,316,416 B2
(45) Date of Patent: Jun. 11, 2019

(54) DIAPHRAGM TYPE ELECTROLYTIC CELL AND A PROCESS FOR THE PRODUCTION OF HYDROGEN FROM UNIPOLAR ELECTROLYSIS OF WATER

(71) Applicant: Rodolfo Antonio M. Gomez, Brompton (AU)

(72) Inventor: Rodolfo Antonio M. Gomez, Brompton (AU)

( * ) Notice: Subject to any disclaimer, the term of this patent is extended or adjusted under 35 U.S.C. 154(b) by 395 days.

(21) Appl. No.: 15/033,035

(22) PCT Filed: Feb. 3, 2015

(86) PCT No.: PCT/AU2015/000050
§ 371 (c)(1),
(2) Date: Apr. 28, 2016

(87) PCT Pub. No.: WO2016/007983
PCT Pub. Date: Jan. 21, 2016

(65) Prior Publication Data
US 2016/0281243 A1 Sep. 29, 2016

(30) Foreign Application Priority Data
Jul. 16, 2014 (AU) .............................. 2014902781

(51) Int. Cl.
| | |
|---|---|
| *C25B 1/10* | (2006.01) |
| *C25B 9/04* | (2006.01) |
| *C25B 9/08* | (2006.01) |
| *C25B 9/18* | (2006.01) |
| *C25B 11/03* | (2006.01) |

(Continued)

(52) U.S. Cl.
CPC .................. *C25B 1/10* (2013.01); *C25B 9/04* (2013.01); *C25B 9/08* (2013.01); *C25B 9/18* (2013.01); *C25B 11/035* (2013.01); *C25B 13/02* (2013.01); *C25B 13/04* (2013.01); *C25B 15/02* (2013.01); *C25B 15/08* (2013.01); *Y02E 60/366* (2013.01)

(58) Field of Classification Search
CPC .. C25B 1/10; C25B 9/08; C25B 13/02; C25B 15/08; C25B 13/04
See application file for complete search history.

(56) References Cited

U.S. PATENT DOCUMENTS

| | | | |
|---|---|---|---|
| 4,105,516 | A | 8/1978 | Martinsons et al. |
| 6,475,653 | B1 | 11/2002 | Gomez |

(Continued)

FOREIGN PATENT DOCUMENTS

| | | | | |
|---|---|---|---|---|
| WO | WO-2012166997 | A2 * | 12/2012 | ............... C01B 7/01 |
| WO | WO-2015101914 | A1 * | 7/2015 | ............. C25B 15/08 |

OTHER PUBLICATIONS

6187/CHE/2013, published Dec. 27, 2013 (Year: 2013).*

(Continued)

*Primary Examiner* — Nicholas A Smith
(74) *Attorney, Agent, or Firm* — Akerman LLP (57) ABSTRACT

The present invention relates to a diaphragm type electrolytic cell and process of production of commercial quantities of hydrogen from the electrolysis of water. The utilization of both alkaline and acidic electrolyte solutions within the electrolytic cell assists to increase the production of hydrogen and oxygen. Additionally, the efficiency of the electrolytic cell is increased due to the elimination of unwanted side reactions.

14 Claims, 10 Drawing Sheets

(51) Int. Cl.
　　　*C25B 13/02*　　(2006.01)
　　　*C25B 13/04*　　(2006.01)
　　　*C25B 15/02*　　(2006.01)
　　　*C25B 15/08*　　(2006.01)

(56) References Cited

U.S. PATENT DOCUMENTS 7,326,329 B2　2/2008　Gomez
2014/0131217 A1　5/2014　Buschmann

OTHER PUBLICATIONS

International Search Report issued in connection with PCT/AU2015/00050 dated Apr. 10, 2015.
Written Opinion of the International Searching Authority issued in connection with PCT/AU2015/00050 dated Apr. 10, 2015.
Written Opinion of the International Searching Authority issued in connection with PCT/AU2015/00050 dated Aug. 21, 2015.
Shimizu, N. et al., "A Novel Method of Hydrogen Generation by Water Electrolysis Using an Ultra-Short-Pulse Power Supply", Journal of Applied Electrochemistry, Jan. 2006, Vol, 36, pp. 419-423.

* cited by examiner

DIAPHRAGM TYPE ELECTROLYTIC CELL AND A PROCESS FOR THE PRODUCTION OF HYDROGEN FROM UNIPOLAR ELECTROLYSIS OF WATER

This application is a national phase of PCT/AU2015/000050, filed Feb. 3, 2015, and claims priority to AU 2014902781, filed Jul. 16, 2014, the entire contents of both of which are hereby incorporated by reference.

TECHNICAL FIELD

The present invention relates to a diaphragm type electrolytic cell and process of production of commercial quantities of hydrogen from the electrolysis of water.

BACKGROUND ART

There is an increased demand for clean and renewable energy sources to negate the adverse effects of utilizing hydrocarbon fuels and the release of carbon into the atmosphere. Hydrogen production is one such proposed solution as it is a clean fuel, producing only water when consumed.

However, currently the majority of hydrogen, approximately 90%, is industrially produced from the gasification of fossil fuels such as natural gas, oil and coal. However, these processes still lead to the emission of carbon dioxides. Therefore, as hydrogen is not generally obtained from carbon oxide free sources, it is not carbon neutral energy source.

Accordingly, there is a growing and renewed interest and need for the production of hydrogen through the electrolysis of water. The production of hydrogen through the electrolysis of water using diaphragm cells is well known. The use of diaphragm cells for the commercial production of hydrogen and oxygen, such as the Knowles and Stuart cells is well established. However, the disadvantage of these conventional diaphragm cells resides in the production of low energy efficiency and low capacity, with approximately 65% energy efficiency in the Knowles cell and approximately 55% in a Stuart cell.

Figure 1:
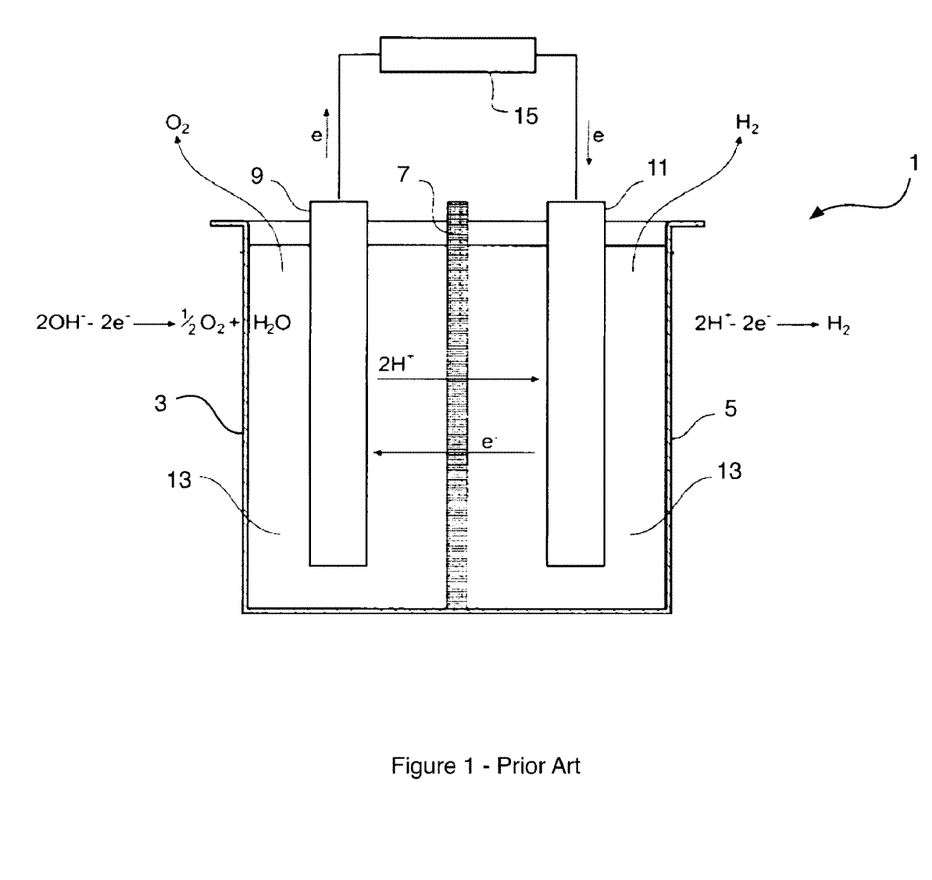
FIG. 1 illustrates a conventional diaphragm cell used in the electrolysis of water where the standard electrode potential $E°=1.229$ volts and the electrolyte is the same in both the anode compartment and cathode compartment.

FIG. 1 illustrates a conventional diaphragm cell in water electrolysis where the standard electrode potential $E°=1.229$ volts and the electrolyte is the same in both the anode cell and cathode cell. However, the diaphragm in such conventional cells remains particularly problematic, wherein it increases impedance and agitation of the electrolyte to reduce over-voltage becomes difficult. The diaphragm must enable electrons to pass through with minimal resistance but must prevent mixing of oxygen and hydrogen produced at the anode and cathode respectively.

In U.S. Pat. No. 7,326,329 and related United Kingdom Patent GB2409865 and Australian Patent 2004237840 titled "Commercial Production of Hydrogen from Water", there is proposed a process for the production of hydrogen from the unipolar electrolysis of water, wherein more hydrogen is produced from the same energy to produce 1 mol of hydrogen from the electrolysis of water.

U.S. Pat. No. 6,475,653 titled "Non-diffusion Fuel Cell and a Process of Using a Fuel Cell" attempts to address the recognized problematic issues with the diaphragm in electrolytic cells, wherein there is disclosed a more efficient hydrogen fuel cell that operates without a diaphragm or membrane. This allows clean electrical energy and transport energy to be derived from renewable energy such as solar and wind.

Accordingly, it is an object of the present invention to provide an improved diaphragm electrolytic cell and an improved process of production of hydrogen from the electrolysis of water.

The present invention provides higher rate of hydrogen production from the electrolysis of water using the structure of the conventional diaphragm type electrolytic cell, wherein a diaphragm is positioned between the anode and cathode or an electrolytic membrane or a salt bridge or semi-conductor or conductor between the anode and cathode. However, instead of utilizing the same electrolyte in both the anode cell and cathode cell, as that disclosed in U.S. Pat. No. 7,326,329, an acid electrolyte is passed through the cathode cell while an alkaline electrolyte is passed through the anode cell. Utilizing the Latimer equations, the standard electrode potential $E°$ becomes $-0.401$ volts, compared to that of the conventional diaphragm cell where the standard electrode potential $E°=1.229$ volts to produce hydrogen and oxygen from the electrolysis of water.

Notably, the efficiency of the electrolytic cell of the present invention is improved as only one of the electrodes of the cell is connected to the power supply. Advantageously, this eliminates any unwanted side reactions at the cathode and anode such as the production of oxygen and hydrogen respectively. Therefore, the efficiency of the electrolytic cell is improved.

A further advantage of the present invention resides in the utilization of the acidic and alkaline electrolytes of the cell to produce hydrogen and oxygen. The acid electrolyte exiting the cathode cell, which contains an excess of $OH^-$ ions that makes the acid electrolyte negative in electrical charge. Additionally, the alkaline electrolyte exiting the anode cell contains an excess of $H^+$ ions that makes the alkaline electrolyte electrically positive. These two electrolytes are passed through another set of electrolytic cells with a diaphragm type structure, wherein the electrolytes will tend to neutralize each other resulting in a current flow. According to Faraday's Law, this will result the production of hydrogen and oxygen.

Other objects and advantages of the present invention will become apparent from the following description, taking in connection with the accompanying drawings, wherein, by way of illustration and example, an embodiment of the present invention is disclosed.

SUMMARY OF THE INVENTION

According to the present invention, although this should not be seen as limiting the invention in any way, there is proposed an electrolytic cell comprising:
- at least one anode compartment housing an anode electrode and alkaline electrolyte;
- at least one cathode compartment housing a cathode electrode and acidic electrolyte;
- at least one partition member separating the anode and cathode compartments;
- a power source connected to either the anode electrode or cathode electrode; and
- a modulator connected to the power source;

wherein the power source is activated, a pulsing current is applied to the anode electrode or cathode electrode through the modulator, such that the modulator generates and delivers the current in the form of at least one current pulse to the anode electrode or cathode electrode, thereby minimizing the onset of polarization and increasing the efficiency of the electrolytic cell.

Preferably, a base member is connected to the anode electrode.

Preferably, the base member is comprised of the same material or coating as the anode electrode.

Preferably, a base member is connected to the cathode electrode.

Preferably, the base member is comprised of the same material or coating as the cathode electrode.

Preferably, a conducting member extends between and connects the anode and cathode compartments.

Preferably, the conducting member is selected from a group consisting of a salt bridge, semi-conductor or conductor member.

Preferably, the partition separating the anode and cathode compartments is a porous diaphragm.

Preferably, the partition separating the anode and cathode compartments is an electrolytic member.

Preferably, the current pulse is applied at range between 1000 Hz to 20,000 Hz.

Preferably, the anode and cathode electrodes are comprised of a porous material.

Preferably, the anode and cathode electrodes are comprised of titanium mesh.

Preferably, the anode and cathode electrodes are coated with a catalyst to promote oxidation and reduction respectively.

Preferably, the catalyst is selected from a group consisting of platinum, platinum oxides, ruthenium, iridium, nickel, cobalt, molybdenum, alloys or oxides of these precious metals and base metals.

Preferably, the anode and cathode compartment further houses a plurality of non-conductive members to facilitate the movement and flow of the alkaline electrolyte through the porous mesh structure of the anode and cathode electrodes.

Preferably, the plurality of non-conductive members is comprised of plastic baffles.

Preferably, the modulator generates and delivers the current in the form of a series of current pulses to the anode or cathode electrodes.

Preferably, the power source is a DC power source at applies a DC current to the modulator.

In an alternative form of the invention, there is proposed a process of production of hydrogen from the electrolysis of water using an electrolytic cell comprising the steps of:
a. passing an alkaline electrolyte through an anode compartment housing an anode electrode to produce oxygen, wherein the anode electrode is connected to a power source;
b. passing an acidic electrolyte through a cathode compartment housing a cathode electrode to produce hydrogen, wherein the cathode is connected to the power source;
c. a base member connected to the anode and cathode electrodes;
d. the anode and cathode compartments are connected a semi-conductor or conductor member that extends between and connects the anode and cathode compartments;
e. connecting a modulator to the power source; and
f. activating the power source to apply a current to the anode electrode or cathode electrode through the modulator, such that the modulator generates and delivers the current in the form of at least one current pulse to the anode electrode or cathode electrode, thereby minimizing the onset of polarization and increasing the efficiency of the electrolytic cell.

BRIEF DESCRIPTION OF THE DRAWINGS

For a better understanding of the present invention and associated method of use, it will now be described with respect to the preferred embodiment which shall be described herein with reference to the accompanying drawings wherein.

DESCRIPTION OF EMBODIMENTS

FIG. 1 illustrates a conventional diaphragm cell 1 used in the electrolysis of water, wherein the standard electrode potential $E°=1.229$ volts. The cell 1 comprises of an anode compartment 3 and a cathode compartment 5. A diaphragm 7 separates the anode 3 and cathode 5 compartments.

The anode compartment 3 contains and houses an anode electrode 9 and the cathode compartment 5 contains and houses a cathode electrode 11. The electrolyte solution 13 in both the anode 3 and cathode 5 compartments is the same.

Both the anode 9 and cathode 11 electrodes are connected to a power source 15, being a DC power source.

However, as outlined above the shortcoming with this type of conventional diaphragm cell 1 resides in the diaphragm 7, wherein it increases impedance and makes it difficult to agitate the electrolyte solution 11 to reduce over-voltage at the anode 9 and cathode 11 electrodes. The diaphragm 7 must allow electrons to pass through, as indicated at arrows A and B with the least resistance whilst preventing the mixing of the oxygen produced at the anode electrode 9 with the hydrogen produced at the cathode electrode 11.

Figure 2:
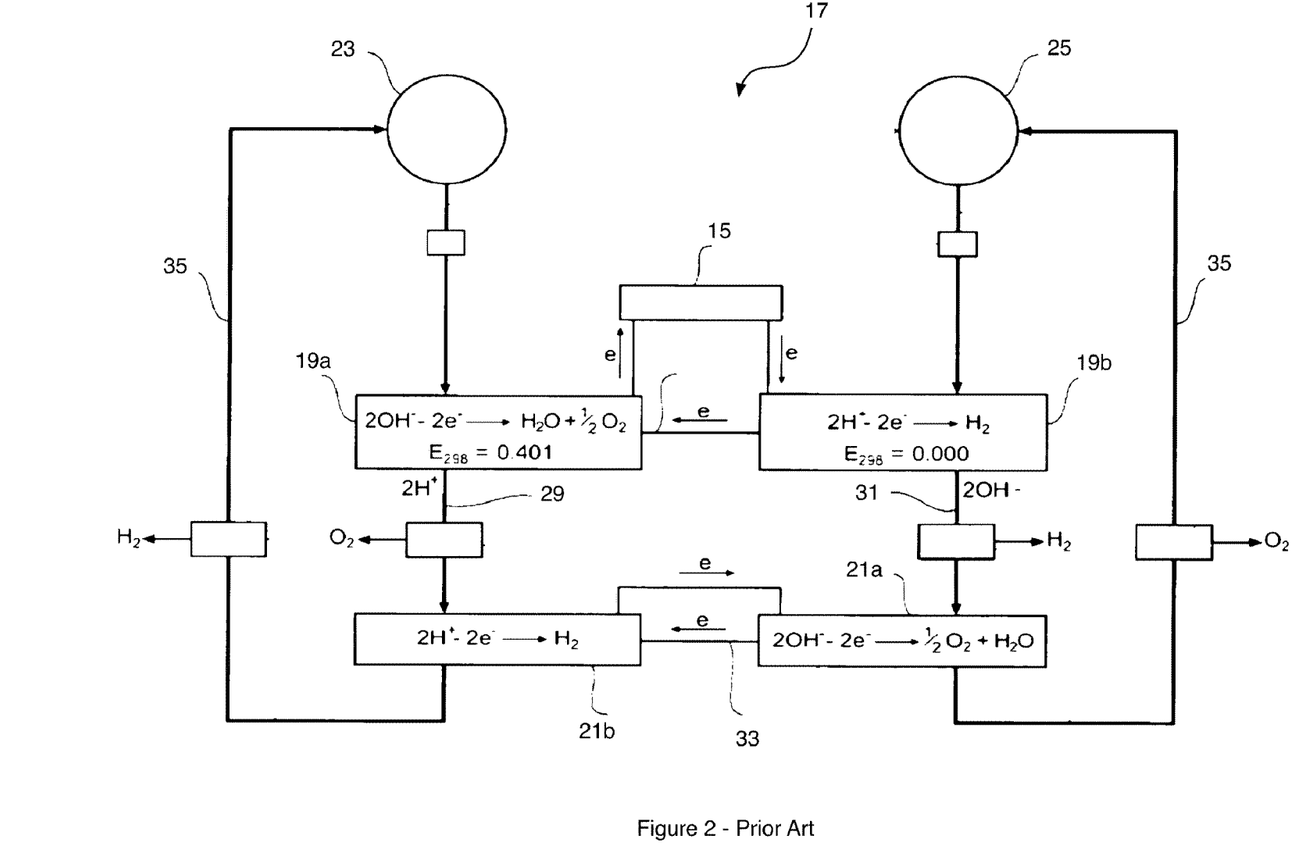
FIG. 2 illustrates a basic electrolytic cell disclosed in U.S. Pat. No. 7,326,329.

FIG. 2 illustrates the basic electrolytic cell 17 set up for the unipolar electrolysis of water disclosed in U.S. Pat. No. 7,326,329. Here two separate circuits are formed, one being of a primary circuit comprising a primary anode cell 19a and a primary cathode cell 19b, and a secondary circuit comprising a secondary anode cell 21a and a secondary cathode cell 21b. The primary circuit consists of an alkaline electrolyte 23 and the secondary circuit consists of an acidic electrolyte 25. The standard electrode potential E° in the primary anode cell 19a to produce hydrogen and oxygen is −0.401 volts. There is greater hydrogen production in the secondary cathode cell 21b.

The positive terminal of a DC power source 15 is connected to the anode electrode 27 of the primary anode cell 19a and the negative terminal is connected to the cathode electrode 29 of the primary cathode cell 19b. The solution electrodes electrically connect the alkaline electrolyte 23 of the primary anode cell 19a to the acidic electrolyte 25 of the primary cathode cell 19b. At the primary anode cell 19a, the following reaction occurs:

$2OH^- - 2e^- \rightarrow H_2O + \frac{1}{2}O_2$

The alkaline electrolyte 29 exiting from the primary anode cell 19a contains excess hydrogen ions so that this electrolyte 29 is positively charged. At the primary cathode cell 19b containing the acidic electrolyte 25, the following reaction occurs:

$2H^+ + 2e^- \rightarrow H_2$

The acidic electrolyte 31 exiting from the primary cathode cell 19b has excess hydroxyl ions so that this electrolyte 31 is negatively charged.

When the alkaline electrolyte 29 and acidic electrolyte 31 are passed through the secondary circuit comprising of the secondary anode cell 21a and a secondary cathode cell 21b, the electrolytes 29, 31 are discharged, causing current to flow from the secondary anode cell 21a to the secondary cathode cell 21b through a conductor 33. This results in further production oxygen from the secondary anode cell 21a and hydrogen from the secondary cathode cell 21b. The neutralized electrolytes 35 and 37 are recycled to the respective primary anode cell 19a and primary cathode cell 19b.

Figure 3A:
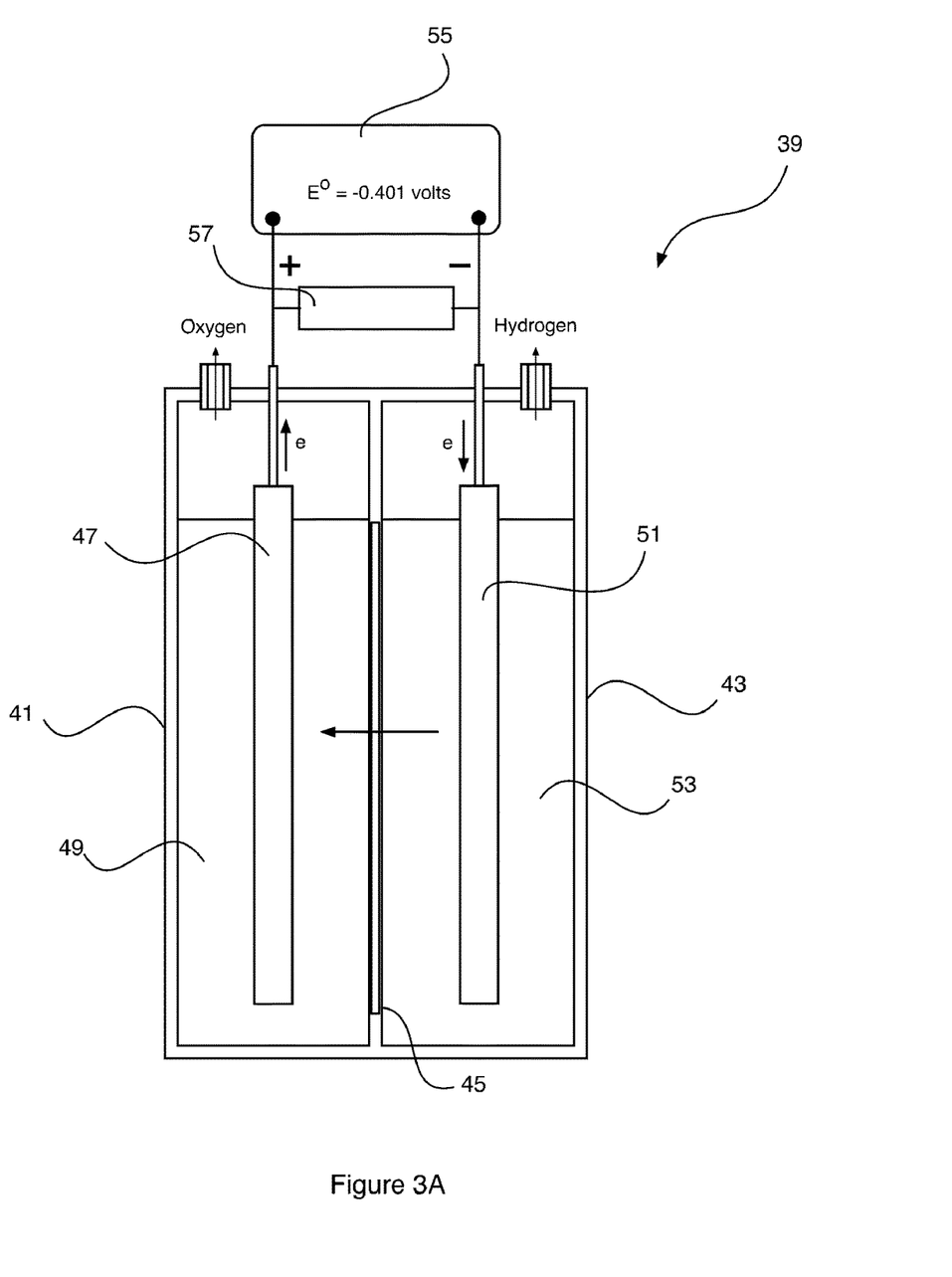
FIG. 3A illustrates one embodiment of the electrolytic cell of the present invention utilizing a conventional diaphragm to separate the anode and cathode compartment.
Figure 3B:
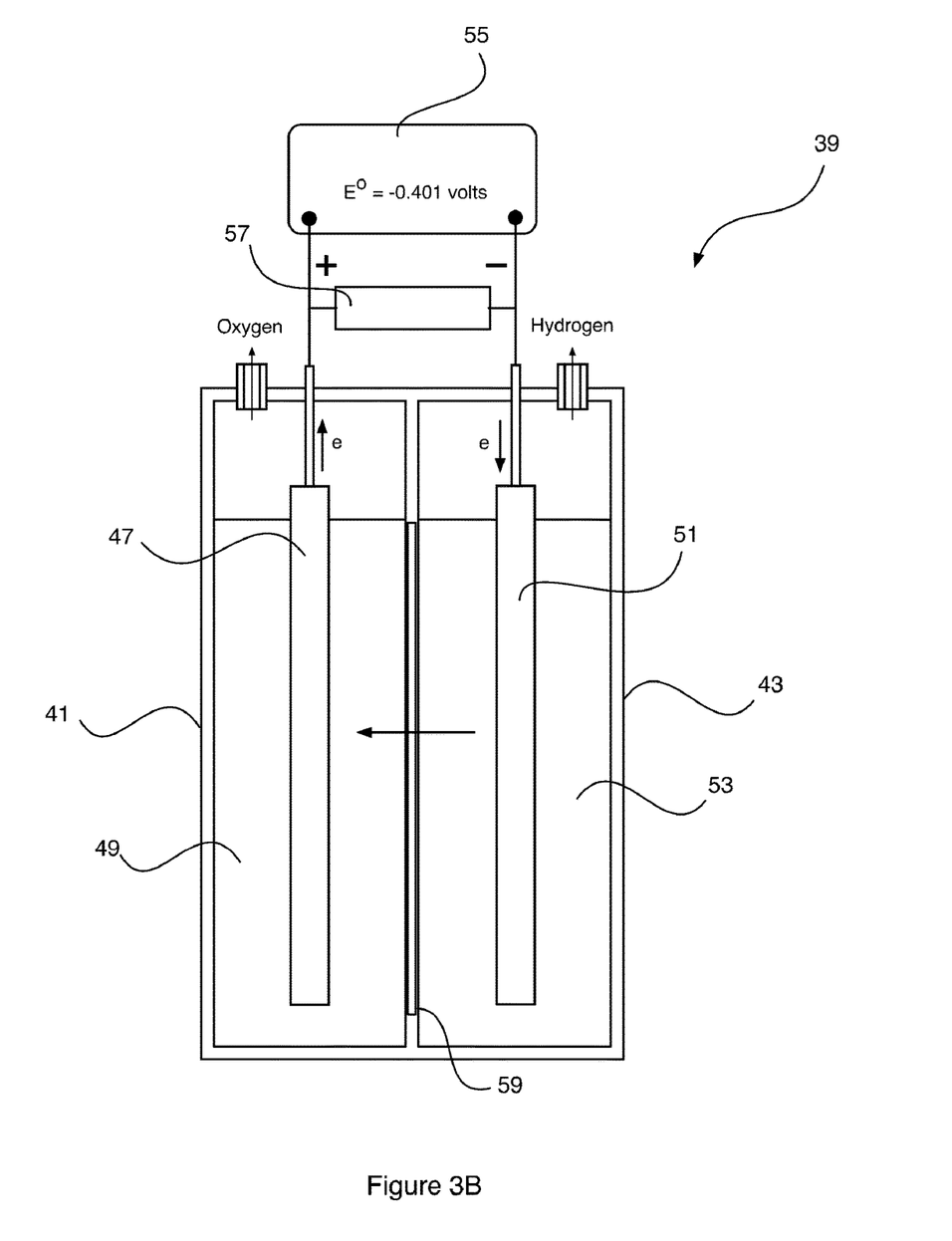
FIG. 3B illustrates a further embodiment of the electrolytic cell of the present invention utilizing an electrolytic membrane to separate the anode and cathode compartment instead of the diaphragm.
Figure 3C:
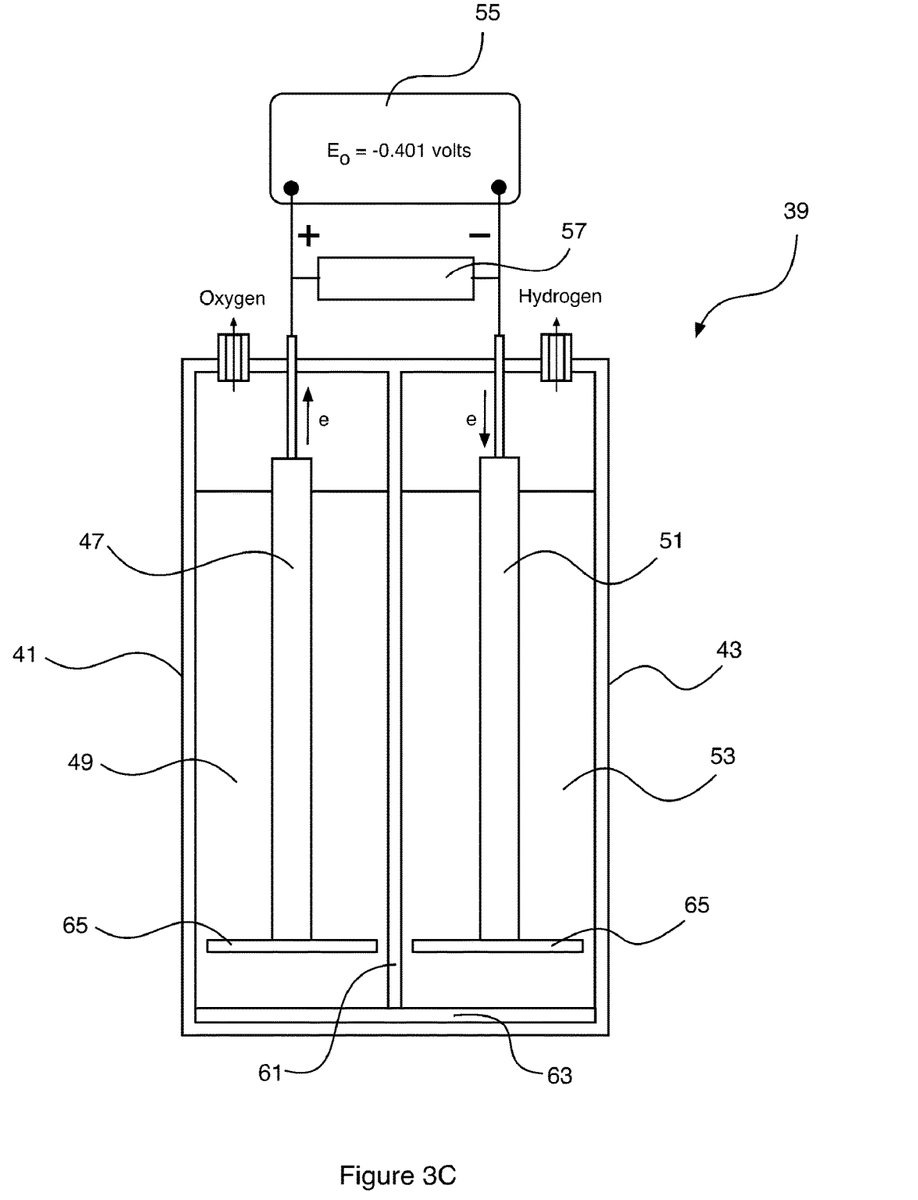
FIG. 3C illustrates a further embodiment of the electrolytic cell of the present invention, utilizing the same structure as the diaphragm cell of FIG. 3A but wherein the anode and cathode compartment is separated by a non-conducting partition.

FIGS. 3A to 3C illustrate differing embodiments of the electrolytic cell 39 of the present invention.

FIG. 3A illustrates an embodiment of the electrolytic cell 39 utilizing a conventional diaphragm cell formed of an anode compartment 41 and a cathode compartment 43, separated by a diaphragm 45. The anode compartment 41 houses an anode electrode 47 and an alkaline electrolyte solution 49 flows through the anode compartment 41. The cathode compartment 43 houses a cathode electrode 51 and an acidic electrolyte solution 53 flows through the cathode compartment 43. The anode 47 and cathode 51 electrodes are connected to a power source 55. The power source 55 being a DC power supply.

A modulator 57 is connected to the DC power source 55 and serves to generate and deliver the current from the DC power source 55 to the anode 47 or cathode 51 electrodes in the form of at least one current pulse. The modulator 57 is adapted to generate and deliver the current in a series of current pulses to the anode 47 or cathode 51 electrodes.

The modulator 57 is a major and advantageous feature of the present invention. In applying a current pulse or series of current pulses to either the anode 47 or cathode 51 electrodes, this advantageously minimizes the onset of polarization in the electrolytic cell 39 and therefore minimizes the adverse affect on the efficiency of the electrolytic cell 39.

The current pulse is applied to either the anode 47 or cathode 51 electrodes at a range of 1000 to 20,000 Hertz and the standard electrode potential is $E_o = -0.401$ volts.

FIG. 3B illustrates a further embodiment of the electrolytic cell 39, however in place of the diaphragm 45 as in FIG. 3A, an electrolytic membrane 59 separates the anode compartment 41 and a cathode compartment 43.

FIG. 3C illustrates further embodiment of the electrolytic cell 39. A non-conductor wall 61 separates the anode compartment 41 and a cathode compartment 43.

Obviously for any electrolytic cell to function properly, there must be a complete electrical circuit. In the embodiment illustrated in FIG. 3C, the circuit is completed through use of a conducting member 63 comprising of either a salt bridge, a semi-conductor plate or a conductor plate. It is readily appreciated that the conducting member 63 may comprise of any suitable member or means known within the art that will enable and maintain sufficient contact between the anode compartment 41 and a cathode compartment 43.

Further, the anode 47 and cathode 51 electrodes are connected to a base member 65. In the illustrated embodiment, the base member 65 is flat plate attached to the bottom of the anode 47 and cathode 51 electrodes. This base member 65 comprises of the same material or coating as the respective anode 47 and cathode 51 electrodes to which it is attached.

The current flow through the electrolytic cell 39 of FIG. 3C is such that the current flows from the DC power source 55, to the modulator 57, to the cathode electrode 51, to the base member 65 attached to the cathode electrode 51, through conducting member 63 comprising of either a salt bridge, semi-conductor or conductor plate, to the base member 65 attached to the anode electrode 47, to the anode electrode 47, back to the DC power source 55.

The electrolytic cell 39 illustrated in FIG. 3C is the preferred embodiment of the present invention as it offers several advantages including:
 a. The least resistance or impedance;
 b. The materials exposed to the alkaline and acidic electrolytes can be selected to withstand high and low pH of the respective electrolytes; and
 c. It offers the highest possible capacity for commercial operation and production of hydrogen.

It would be readily appreciated that any number of anode 47 and cathode 51 electrodes can be attached to the base member 63 in the electrolytic cell 39 illustrated in FIG. 3C, so as to increase the capacity of the electrolytic cell 39 and system.

Figure 4A:
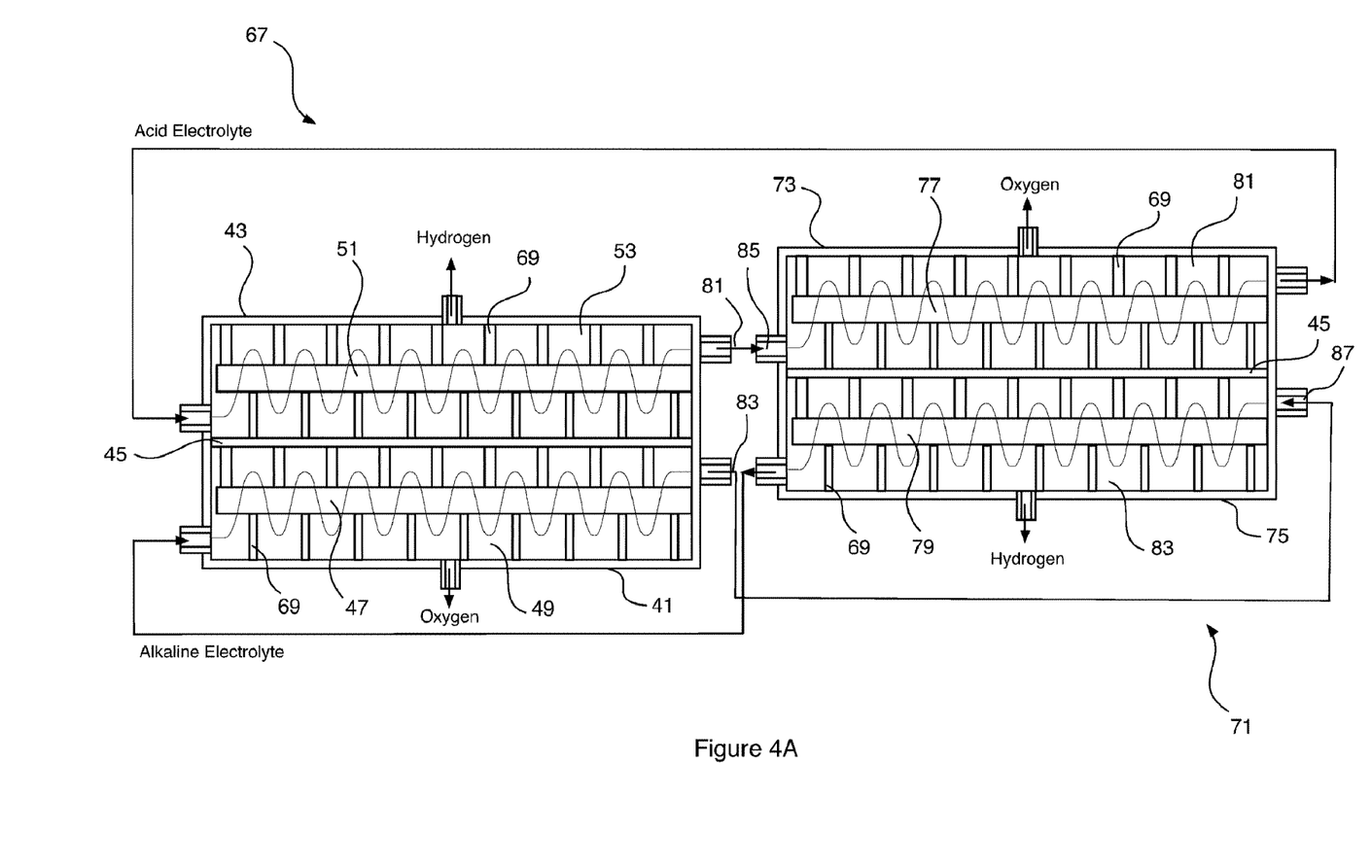
FIG. 4A is a plan view of the electrolytic system of the present invention having an electrolytic section and a neutralization section.

FIG. 4A is a plan view of an electrolytic cell of the present invention, utilizing two electrolytic cells, a first electrolytic cell 67 and a second electrolytic cell 71, each having an anode compartment 41, 73 and a cathode compartment 43, 75 separated by a diaphragm 45. A first electrolytic cell 67 serves as the electrolytic section where electric power is applied. The first electrolytic cell 67 comprises of an anode electrode 47 and a cathode electrode 51. The anode 47 and cathode 51 electrodes are formed of a porous material such as expanded mesh or similar construction.

Each of the anode compartments 41, 73 and a cathode compartments 43, 75 further comprise and house a plurality of non-conductive members 69. The non-conductive members 69 being a plurality of plastic baffles.

The non-conductive members 69 assist to facilitate the movement and flow of the alkaline 49, 83 and acidic 53, 81 electrolyte solutions throughout the anode compartments 41, 73 and a cathode compartments 43, 75. The non-conductive members 69 force the alkaline 49, 83 and acidic 53, 81 electrolyte solutions in and out of the porous mesh structures of anode electrodes 47, 77 and a cathode electrodes 51, 79.

The anode electrodes 47, 77 and cathode electrodes 51, 79 for example, can be formed from titanium mesh. Further, the anode electrodes 47, 77 and a cathode electrodes 51, 79 may be coated with a suitable catalyst to favour the reaction that is desired at the respective anode electrodes 47, 77 and a cathode electrodes 51, 79.

For example, the anode electrodes 47, 77 that produce oxygen, can be coated with a catalyst made form oxides of ruthenium and iridium or platinum or mixtures. Similarly, the cathode electrodes 51, 79 may be coated with a catalyst having different ratios of the platinum group oxides.

A second electrolytic cell 71 serves as a neutralization section, comprising of an anode compartment 73 and a cathode compartment 75 and houses an anode electrode 77 and a cathode electrode 79, respectively. The second electrolytic cell 71 allows the neutralization of the negatively charged acidic electrolyte solution 81 and the positively charged alkaline electrolyte solution 83, exiting from the first electrolytic cell 67. As a result, current flows between the anode electrode 77 and the cathode electrode 79 and according to Faraday's Law, chemical reactions occur at the anode electrode 77 and the cathode electrode 79.

Figure 4B:
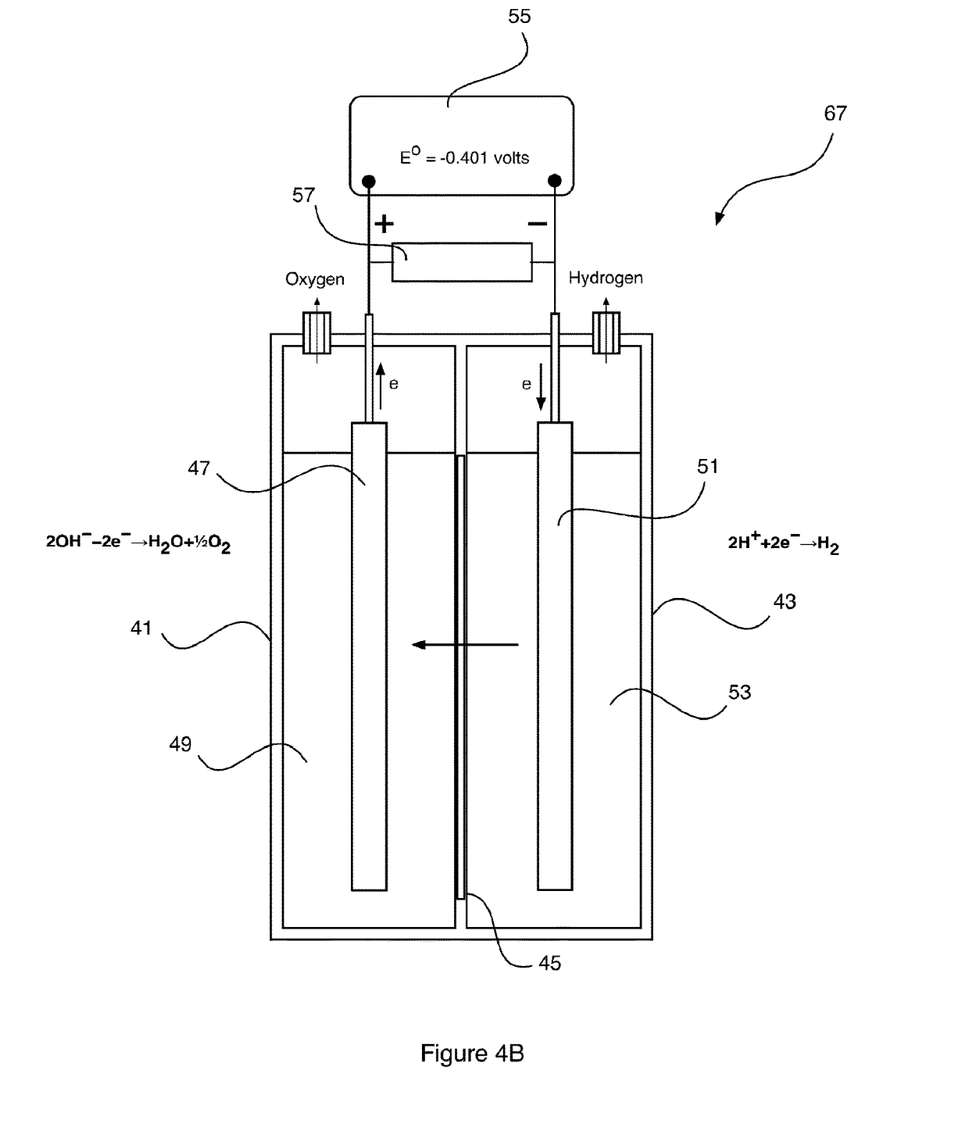
FIG. 4B is a cross sectional view of the electrolytic section of FIG. 4A.

The current flows in the first electrolytic cell 67 of FIG. 4A are shown in FIG. 4B, which is a cross section of the first electrolytic cell 67. The current flows from the DC source 55 to the anode electrode 47, through the diaphragm 45 and then to the cathode electrode 51 to the DC power source 55.

Figure 4C:
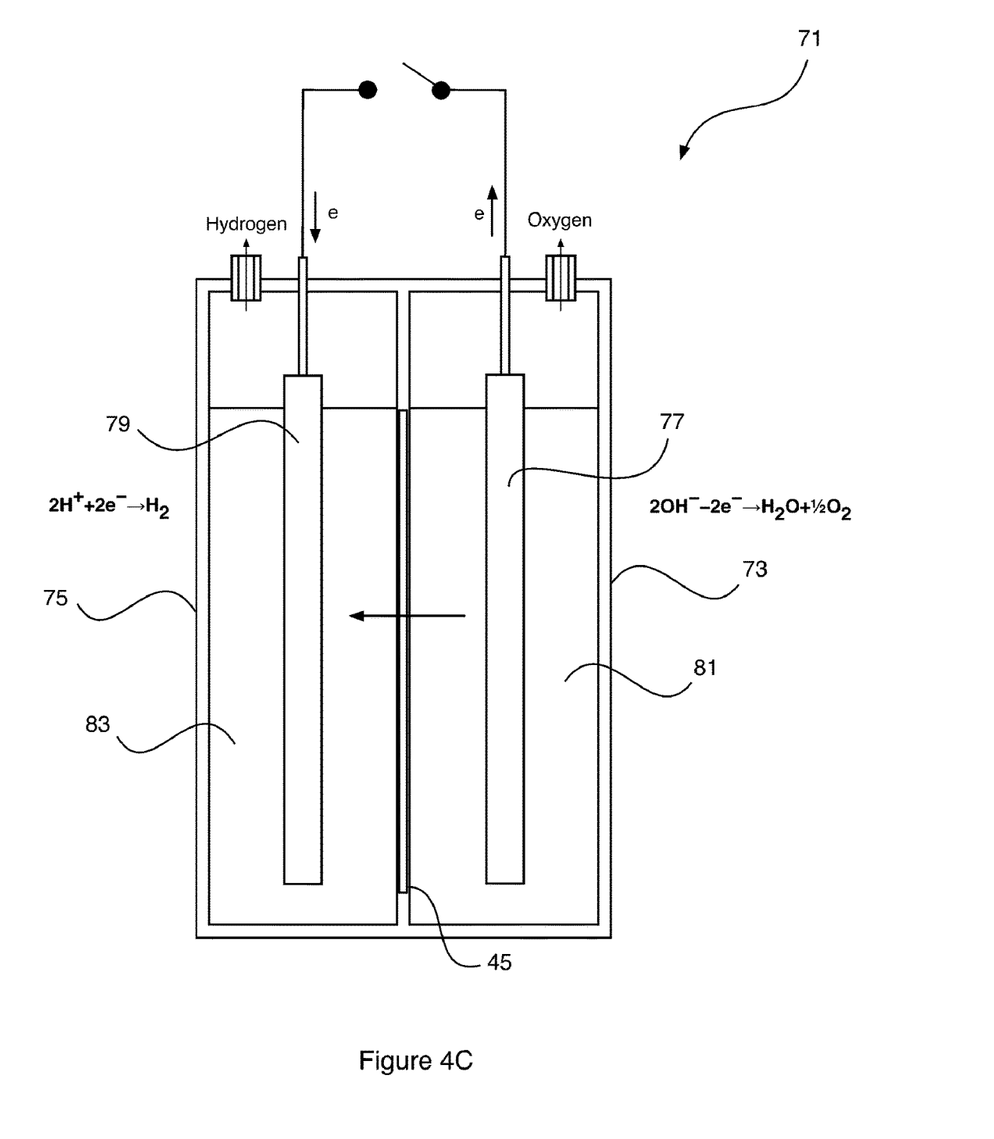
FIG. 4C is a cross sectional view of the neutralization cell of FIG. 4A.

FIG. 4C is a cross section of the second electrolytic cell 71, being the neutralization cell and depicts the formation of hydrogen at the cathode electrode 79, while oxygen is produced at the anode electrode 77, according to the chemical formulas shown.

The acidic electrolyte solution 81 exiting from the cathode compartment 43 of the first electrolytic cell 67 is fed into the inlet 85 of the anode compartment 73 of the second electrolytic cell 71. The alkaline electrolyte solution 83 exiting the anode compartment 41 of the first electrolytic cell 67 is fed to the rear inlet 87 of the cathode compartment 75 of the second electrolytic cell 71.

This set up will allow a better operation of the second electrolytic cell 71 as the potential difference of the alkaline 83 and acidic 81 electrolyte solutions is evened up rather than the strongest electrolyte solutions neutralizing each other and resulting in the weakened electrolyte solutions towards the end of the second electrolytic cell 71 having reduced potential to neutralize each other.

FIGS. 4A to 4C illustrate the process of electrolyzing water for increased hydrogen production. Electric power, through a DC power source 55 is applied through a modulator 57 to the anode electrode 47 housed within the anode compartment 41 of the first electrolytic cell 67, which contains the alkaline electrolyte solution 49 and to the cathode electrode 51 housed within the cathode compartment 43, which contains the acidic electrolyte solution 53, with a membrane or diaphragm 45 separating between the anode 47 and cathode 51 electrodes. The anode 47 and cathode 51 electrodes are made of titanium mesh as an example and coated with a catalyst such as platinum, platinum group oxides or metals such as nickel, cobalt, molybdenum or alloys or oxides of these precious and base metals.

Each of the anode compartments 41, 73 and a cathode compartments 43, 75 comprise of a plurality of non-conductive members 69, being a plurality of plastic baffles. These non-conductive members 69 are used to guide the alkaline 49, 83 and acidic 53, 81 electrolyte solutions, in and out of the anode electrodes 47, 77 and a cathode electrodes 51, 79, as the electrolyte solutions move from one end to the other in the respective anode compartments 41, 73 and a cathode compartments 43, 75.

It is readily appreciated that there may be more than 1 set of anode electrodes 47, 77 and a cathode electrodes 51, 79 utilized in the first electrolytic 67 and second electrolytic 71 cells of the present invention. The electrolytic membrane 59 is commercially available and the diaphragm 45 may be made from an acid and alkali resistant material such as Teflon or polyurethane.

The pressure in the first electrolytic 67 and second electrolytic 71 cells may range from atmospheric up to 20 atmospheres and the temperature may range from 15° C. up to 200° C. The electrolyte solutions utilized in the first electrolytic 67 and second electrolytic 71 cells may include an inorganic acid and base, or weaker acid such as boric acid and weaker alkaline such as ammonia.

The electrolyte solutions 49, 53 exiting the first electrolytic cell 67 are positively and negatively charged and these charged electrolyte solutions 49, 53 are passed through the second electrolytic cell 71 where the electrolyte 49, 53 are short circuited leading the current flowing as shown in FIG. 4. Faraday's law provides that when current flows, substances are produced at the anode 77 and cathode 79 electrodes. In this case, hydrogen is produced at the anode 77 electrodes and oxygen is produced at the 79 cathode electrodes.

This increases the production of hydrogen so that theoretically, based on the voltage of 0.4012 volts at the first electrolytic cell 67, 2 moles of hydrogen are produced by applying only 0.401 volts at the primacy electrolytic cell 67. By calculation theoretically, 6.13 times more hydrogen is produced for the same energy used to produce 1 mol of hydrogen using the conventional electrolytic cell, in either alkaline electrolyte or acid electrolyte.

Figure 5A:
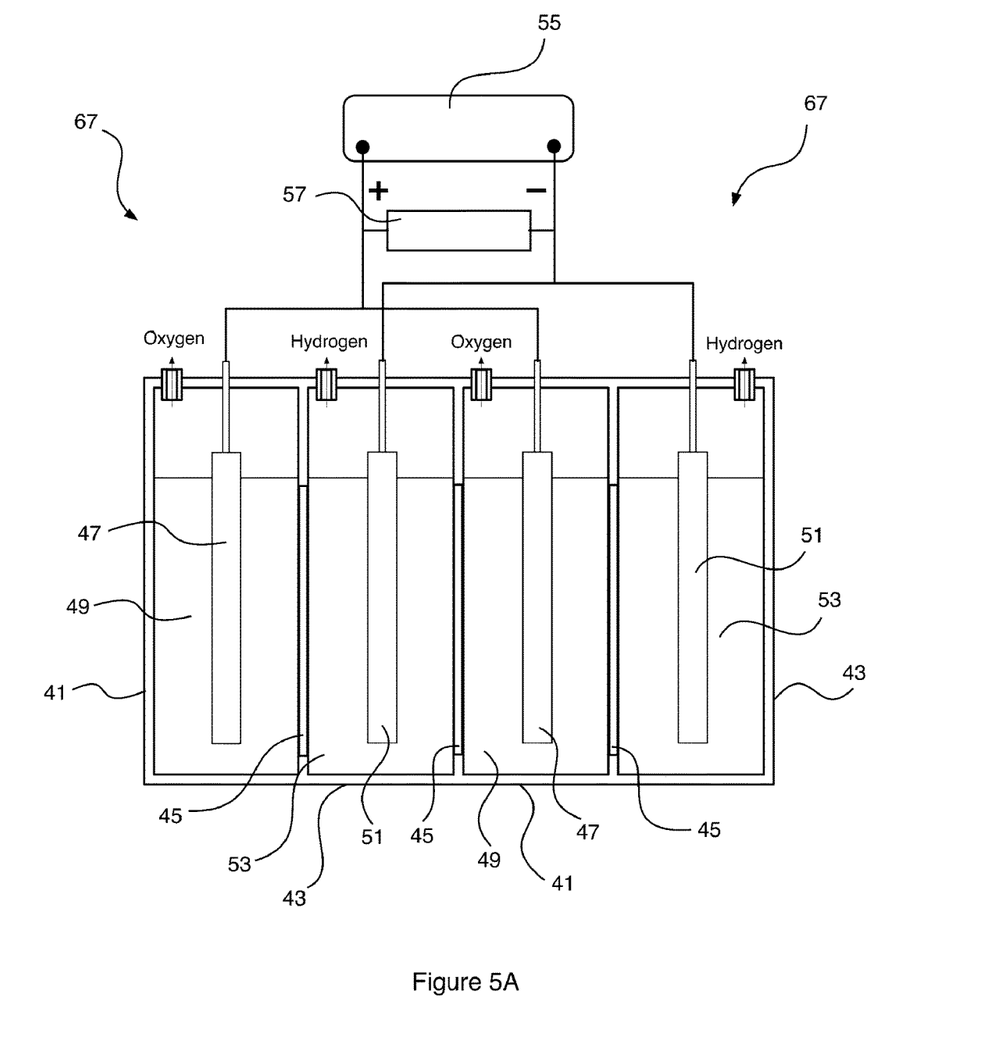
FIG. 5A illustrates a cross sectional view of a further embodiment of the electrolytic cell of the present invention wherein multiple electrolytic cells are structured together to produce a higher capacity system.
Figure 5B:
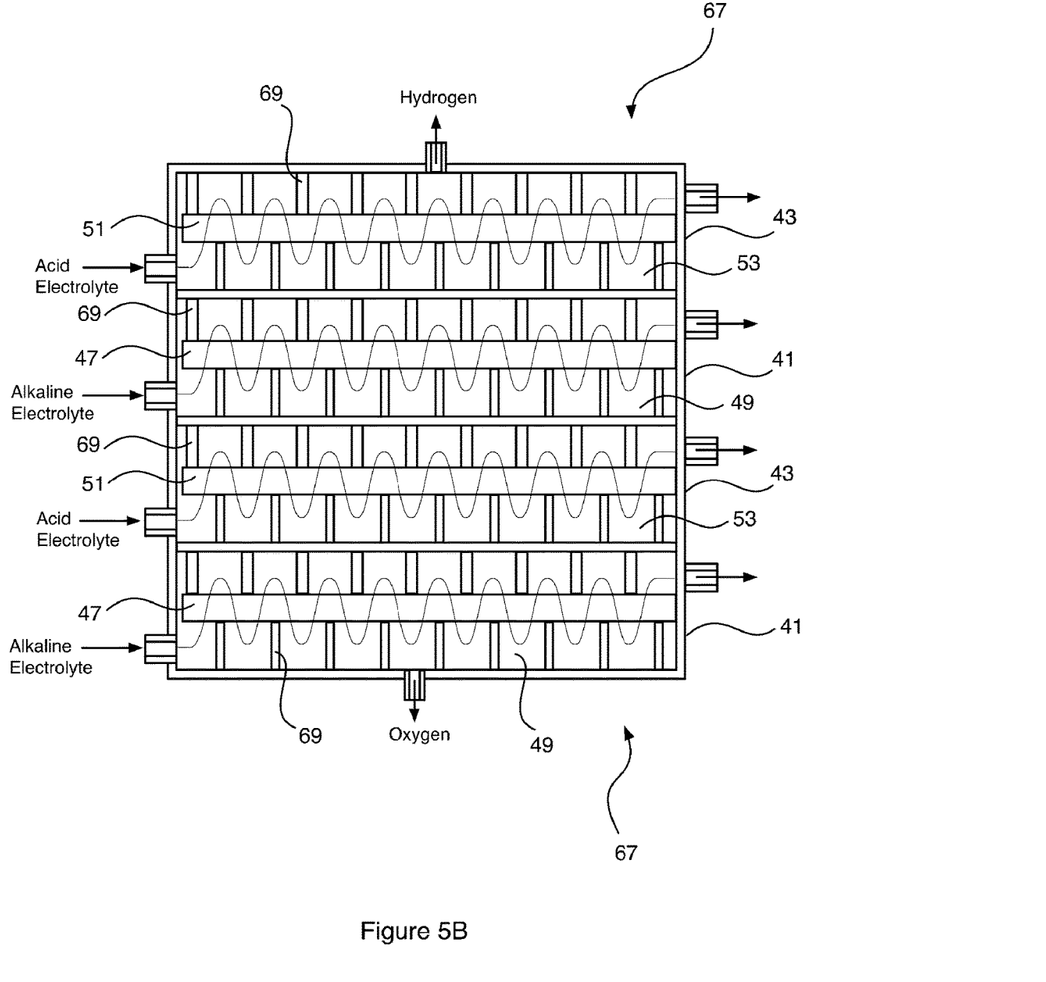
FIG. 5B illustrates a plan view of the multiple electrolytic cells.

FIG. 5A illustrates a cross sectional view of a further embodiment of the electrolytic cell of the present invention wherein multiple electrolytic cells 67 are structured together to produce a higher capacity system. FIG. 5B illustrates the plan view of the multiple electrolytic cells 67.

The electrolytic cells 67 could operate at atmospheric pressure or a moderate pressure no higher than 20 bars and a temperature no higher than 200° C.

The preferred embodiment of the present invention is illustrated in FIG. 3C, wherein the configuration offers a high capacity. In this embodiment the complete electrical circuit is made possible by the base member 65 connected to anode 47 and cathode 51 electrodes and a conducting member 63 in the form of either a salt bridge, a semiconductor plate or a conductor plate, located at the bottom of the anode 41 and cathode 43 compartments of the electrolytic cell 67.

The invention claimed is:
1. An electrolytic cell system comprising: at least first electrolytic cell having at least one anode compartment housing an anode electrode and alkaline electrolyte producing oxygen and at least one cathode compartment housing a cathode electrode and acidic electrolyte producing hydrogen with a partition member separating the anode compartment from the cathode compartment and a DC sup applied to the anode and cathode electrodes;
at least a second electrolytic cell having at least one cathode compartment housing a cathode electrode receiving the positively charged alkaline electrolyte from the first anode cell and producing hydrogen, and having at least one anode compartment housing an anode electrode and receiving the negatively charged acidic electrolyte from the first cathode cell and producing oxygen with a partition member separating the anode cell from the cathode cell, when the anode electrodes and the cathode electrodes are connected in short circuit;

wherein at least there is one partition member separating the anode and cathode compartments in each of the first and second electrolytic cells; and wherein the partition member is a porous diaphragm or an electronic membrane.

2. The electrolytic system as in claim 1, wherein a direct current (DC) power source connected to the modulator of the first cathode and first anode electrodes.

3. The electrolytic system as in claim 1, wherein a modulator connected to the DC power source provides a pulsing current to the anode electrodes and the cathode electrodes of the first electrolytic cell and the second electrolytic cell, the pulsing current being pulsed at 100 to 20,000 hertz.

4. The electrolytic system as in claim 1, wherein the modulator and the anode and cathode electrodes of the second electrolytic cell form a short circuit to allow current flow from the acidic electrolyte to the alkaline electrolyte enabling hydrogen production at the cathode electrode and oxygen production at the anode electrode of the second electrolytic cell thereby minimizing the onset of polarization and increasing the production of oxygen and hydrogen of the electrolytic cell system.

5. The electrolytic cell system according to claim 1, wherein the cathode electrodes of the first electrolytic cells are coated with a material that favors the production of hydrogen and the anode electrodes are coated with a material that favors the production of oxygen.

6. The electrolytic cell system according to claim 1, wherein the cathode electrodes of the second electrolytic cells are coated with a at least one material that favors the production of hydrogen and the anode electrodes are coated with a material that favors the production of oxygen.

7. The electrolytic cell system according to claim 6, wherein the at least one material coating the anode or cathode electrodes is selected from the group of the metals, alloys or oxides thereof comprising ruthenium, iridium, rhodium, nickel, cobalt, molybdenum, copper, zinc, platinum, palladium, gold, silver, or rare earth elements.

8. The electrolytic cell system according to claim 1, wherein a conducting member extends between and connects the anode and cathode compartments in each of the first electrolytic cells.

9. The electrolytic cell system according to claim 8, wherein a conducting member extends between and connects the anode and cathode compartments in each of the second electrolytic cells.

10. The electrolytic cell system according to claim 8, wherein the anode and cathode electrodes in each of the first and second electrolytic cells are comprised of a porous material including a titanium mesh sheet.

11. The electrolytic cell system according to claim 10, wherein the anode and cathode compartments in each of the first and second electrolytic cells further house a plurality of non-conductive members to facilitate the movement and flow of electrolyte through the porous titanium mesh of the anode and cathode electrodes in each of the first and second electrolytic cells.

12. The electrolytic cell system according to claim 11, wherein the plurality of non-conductive members is comprised of plastic baffles.

13. The electrolytic system as in claim 1, where the cells are operated at atmospheric up to 20 atmosphere pressure and temperature of up to 200 degrees Celsius.

14. A process of production of hydrogen from the electrolysis of water using an electrolytic cell system according to claim 1 comprising the steps of:
  a. connecting a power source to the first electrolytic cell having an anode compartment housing an anode electrode and a cathode compartment housing a cathode electrode;
  b. connecting a modulator to the power source;
  c. passing an alkaline electrolyte through the anode compartment of the first electrolytic cell to produce oxygen, wherein the anode electrode is connected to a power source;
  d. passing an acidic electrolyte through the cathode compartment of the first electrolytic cell to produce hydrogen, wherein the cathode is connected to the power source;
  e. activating the power source to apply a pulsing current to the anode electrode or cathode electrode of the first electrolytic cell through the modulator, the modulator generates and delivers the pulsing current in the form of at least one current pulse to the anode electrode or cathode electrode of the first electrolytic cell;
  f. directing and passing the acidic electrolyte exiting the cathode compartment of the first electrolytic cell, and the alkaline electrolyte existing the anode compartment of the first electrolytic cell, through a second electrolytic cell having at least one cathode compartment housing a cathode electrode and alkaline electrolyte and at least one anode compartment housing an anode electrode and acidic electrolyte, the cathode and anode electrodes of the second electrolytic cell form a short circuit with a modulator; and
  g. activating the short circuit of the second electrolytic cell to allow current flow from the acidic electrolyte to the alkaline electrolyte enabling hydrogen production at the cathode electrode and oxygen production at the anode electrode of the second electrolytic cell thereby minimizing the onset of polarization and increasing the efficiency of the electrolytic cell system.

* * * * *